United States Patent [19]

Rouillard épouse Bauer et al.

[11] 4,389,379

[45] Jun. 21, 1983

[54] PROCESS FOR SELECTIVE LIQUID-LIQUID EXTRACTION OF GERMANIUM

[75] Inventors: Denise Rouillard épouse Bauer, Le Raincy; Gérard Cote, Paris, both of France; Paolo Fossi, Elancourt, Italy; Bruno Marchon, Paris, France

[73] Assignee: Société Minière et Métallurgique de Penarroya, Paris, France

[21] Appl. No.: 178,583

[22] Filed: Aug. 15, 1980

[51] Int. Cl.³ ............................................. C01G 17/00
[52] U.S. Cl. ........................................ 423/89; 423/99; 423/139
[58] Field of Search ............................ 423/89, 99, 139

[56] References Cited

U.S. PATENT DOCUMENTS 3,637,711  1/1972  Budde et al. ............... 423/DIG. 14
3,883,634  5/1975  DeSchepper et al. ................ 423/89

FOREIGN PATENT DOCUMENTS 1061574  9/1979  Canada ............................ 75/101 BE

OTHER PUBLICATIONS

Rudenko et al., "Extraction Kinetics of Germanium 8-Oxyquinolinate", Vestnik Moskovskogo Universiteta, Khimiya, vol. 24, No. 4, pp. 103-106, 1969.
Hydrometallurgy, 5 (1980), 149-160.
J. Inorgan. Nucl. Chem., 41, 1353-1363, (1979).

Primary Examiner—O. R. Vertiz
Assistant Examiner—Wayne A. Langel
Attorney, Agent, or Firm—Fleit, Jacobson & Cohn

[57] ABSTRACT

A process for selective liquid-liquid extraction of germanium from an aqueous acidic liquor containing, besides germanium, at least another metal selected from the group which comprises cadmium, zinc, cobalt and nickel. This process includes extracting germanium from said aqueous liquor by contacting said liquor with an organic medium containing a diluent and an extractant, said diluent being immiscible with said aqueous liquor. The major part of germanium passes from said aqueous liquor to an organic phase which is subsequently submitted to a stripping step by contacting with an alkaline medium, with formation of an aqueous phase containing the major part of germanium from said aqueous liquor.

13 Claims, 3 Drawing Figures

PROCESS FOR SELECTIVE LIQUID-LIQUID EXTRACTION OF GERMANIUM

FIELD OF THE INVENTION

The invention relates to liquid-liquid extraction of metals from aqueous acidic liquors, and more particularly to a process for selective extraction of germanium from aqueous acidic liquors containing also at least one metal selected from the group which comprises cadmium, zinc, cobalt and nickel.

BACKGROUND OF THE INVENTION

The separation of germanium from acidic leach liquors has attracted great attention because of its economic implication, especially in zinc production. The electrolysis of zinc can be achieved with a good yield only when germanium has been completely eliminated from the electrolyte. This separation is therefore a preliminary operation to the recovery of zinc metal from solutions. Moreover, the recovery of germanium from such solutions constitutes the main available source of this metal, applications of which are essential in many areas such as electronics, infrared optics, fiber optics, ionized particles detection and polymer chemistry.

The leaching treatment of minerals is performed with sulphuric acid for economic reasons and leads to liquors containing chiefly zinc sulphate (about 100 g/l), germanium (IV) (0.1-1 g/l) and other elements such as cadmium, magnesium, etc. As these metals do not interfere with the electrolysis of zinc or are easily removed, a selective separation of germanium from the acid liquor would be advantageous for isolation of this metal.

PRIOR ART

Conventional processes for separating germanium from acidic leach liquors (precipitation with tannin, distillation of $GeCl_4$, etc.) are very complicated. Consequently, liquid-liquid extraction and resin separation methods appear to be attractive and have been widely studied. Various solvents such as carbon tetrachloride, chloroform and tributylphosphate, and extractants such as long chain amines, alkylphosphoric acids, phosphinic acids, oxine, hydroxamic acids and alkylpyrocatechol as well as many resins have been proposed. However, the low capacity of most resins and extractants, their prohibitive costs and the strict separation conditions they sometimes impose, have often limited their application. The $\alpha$-hydroxyoxime compounds, recently introduced, appeared until recently to be the most suitable reagants from the preparative solvent extraction of germanium. Their application for industrial germanium recovery have been studied and pilot plan experiences have been carried out, as described by De Schepper, A. Hydrometallurgy, 1 (1976) 291. Though they are very interesting, these compounds still require severe conditions (e.g. high acidity of the aqueous solution and high extractant concentraction) to be efficient.

OBJECTS OF THE INVENTION

It is an object of this invention to provide a process for selective liquid-liquid extraction of germanium from aqueous acidic liquors containing at least another metal selected from the group which comprises cadmium, zinc, cobalt and nickel.

Another object of this invention is to provide a process for selective extraction of germanium from aqueous acidic leach liquors containing zinc metal.

Another object of this invention is the selective extraction of germanium from such a liquor by contacting said liquor with an organic medium containing a particular extractant.

It is another object of this invention to provide such a process for extraction of germanium from such liquors with a yield of about 100%.

It is another object of this invention to provide a process for selective extraction of germanium from such liquors requiring only very short time for contacting said liquors with an organic medium.

It is another object of this invention to provide a process for extraction of germanium from such liquors by treating said liquors about at ambient temperature.

It is another object of this invention to separate germanium from aqueous liquors containing zinc by a low cost process.

SUMMARY OF THE INVENTION

According to the invention, a process for selective liquid-liquid extraction of germanium from an aqueous acidic liquor containing, besides germanium, at least one other metal selected from the group comprising cadmium, zinc, cobalt and nickel, includes extracting germanium from said aqueous liquor by contacting said liquor with an organic medium which contains a diluent and an extractant, said diluent being immiscible with said aqueous liquor, said extractant being selected from the oxine (8-hydroxy-quinoline) derivatives having a long hydrocarbon chain, said contacting step forming an aqueous phase containing the major part of said at least one other metal, and an organic phase containing the major part of germanium from said aqueous liquor, and stripping germanium from said organic phase by contacting said phase with an alkaline medium, said stripping step forming an aqueous phase containing the major part of germanium from said aqueous liquor and an organic phase containing said diluent and said extractant.

According to the invention, the long hydrocarbon chain of said extractant includes at least eight carbon atoms and preferably up to sixteen carbon atoms, and has at least one ethylenical unsaturation. Preferably, said extractant is $\beta$-dodecenyl 8-hydroxyquinoline, but other positions of said chain are in the scope of the invention.

The pH of said aqueous acidic liquor is preferably lower than 2. If said aqueous liquor is not sufficiently acidic, said liquor is preferably acidified, for example, by addition of sulphuric acid. Said diluent is preferably selected from the group comprising pure and mixed aliphatic compounds and petroleum fractions and such compounds and fractions mixed with a minor proportion of an alcohol or a phenol, for example, n-octanol.

Said alkaline medium used in the stripping step is preferably such that the pH is greater than 10.

During the extracting step, the temperature is preferably ambient or lower, and, during the stripping step, the temperature is preferably ambient or greater.

The concentration of extractant in organic medium used in the stripping step is preferably such that there are at least 4 moles of extractant for 1 mole of germanium from said aqueous acidic liquor.

Other objects and features of this invention will be apparent in the following description and claims in which the principles of the invention are set forth together with details directed to those skilled in the art to enable them to practice the invention, all in connection with the best mode presently contemplated.

DESCRIPTION OF THE PREFERRED EMBODIMENTS

Figure 1:
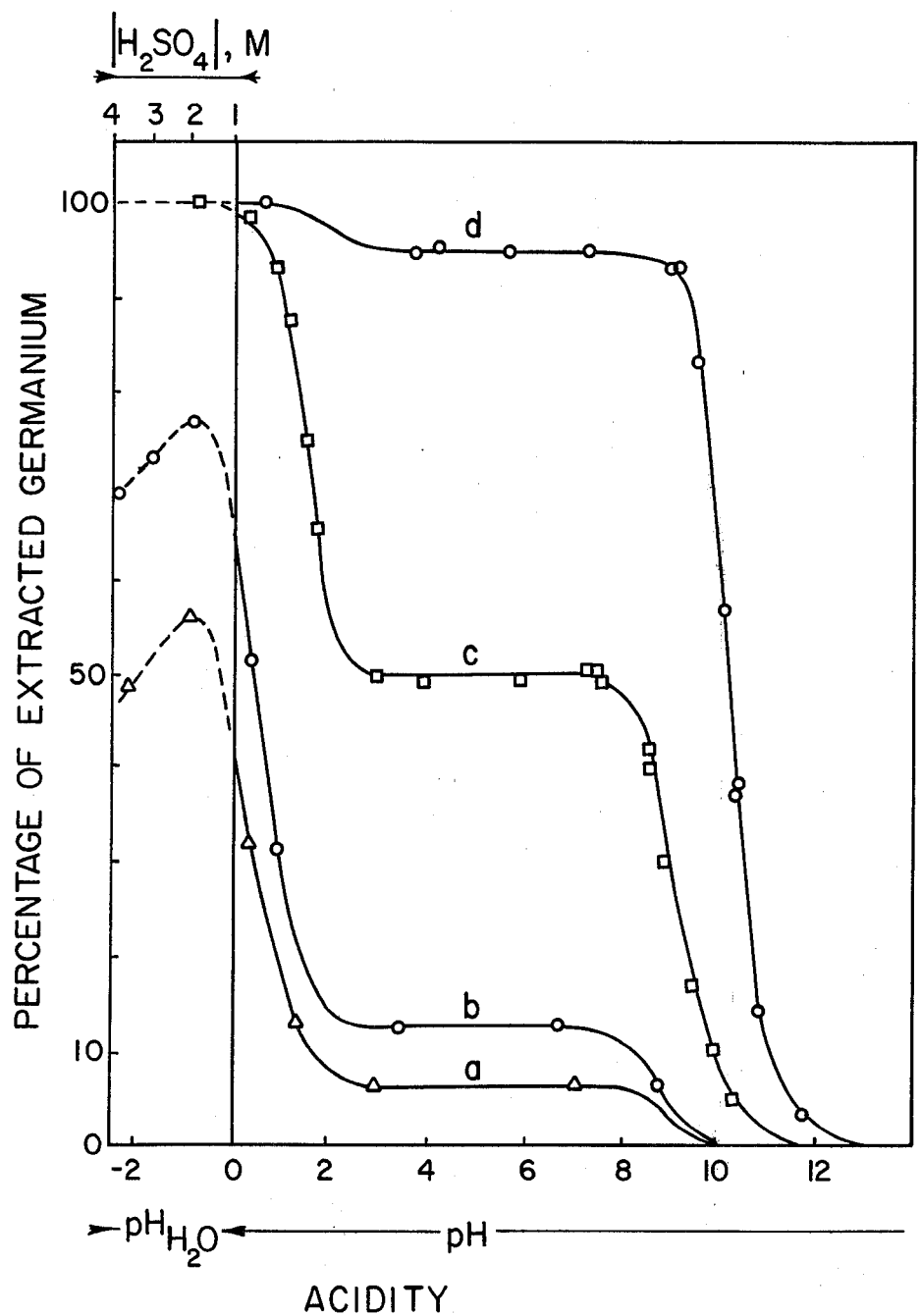
FIG. 1 is a graph illustrating the variation of germanium extracted from acidic leach liquors, according to acidity of medium.

A process according to the invention includes essentially two main steps, an extracting one and a stripping one.

The extracting step includes extracting germanium from said aqueous liquor by contacting said liquor with an organic medium which contains a diluent and an extractant. The stripping step includes stripping germanium from an organic phase formed during said extracting step, by contacting with an alkaline medium.

However, said process may include other steps. For example, if said aqueous acidic liquor is not sufficiently acidic, it is preferable to acidify said liquor, for example, by addition of sulphuric acid. However, other acids well known by those skilled in the art may be used. Sulphuric acid is preferable, especially because it is very cheap and easily available, but it possesses also some advantages indicated in the following.

Moreover, between extracting and stripping steps, said process includes preferably at least one scrubbing step in which the organic phase formed during said extracting step is contacted with water which removes the greatest part of the small remaining part of said other metal, for example, zinc. Such a scrubbing step removes the small proportion of H+ which may be remaining in said organic phase. It has also been surprisingly observed that such a scrubbing step provides for purification of said organic phase.

The scrubbing medium is preferably water if volumes are not too important, said water being acidified by H+ (H₂SO₄) removed during said step, or a sulphuric acid solution having a concentration between 0.1 and 0.5 N, preferably about 0.2 N.

Moreover, after the stripping step, said aqueous phase may be treated for the recovery of germanium metal or of other useful products.

The main feature of the invention is the extractant used which is selected from the oxine derivatives having a long hydrocarbon chain. Preferably, said long chain includes at least 8 and up to 16 carbon atoms. It has preferably at least one ethylenical unsaturation.

Preferably, the extractant comprises a compound of the formula

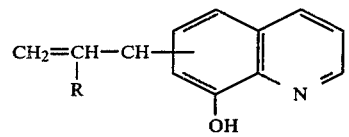

wherein R is alkyl having 8 to 16 carbon atoms, the total carbon atoms in R being at least sufficient to ensure that the germanium chelate of said compound is soluble in hydrocarbon.

A compound very useful is 7-[3-(5,5,7,7-tetramethyl-1-octenyl)]-8-hydroxyquinone, a β-alkenyl derivative of 8-hydroxyquinoline which has the structure:

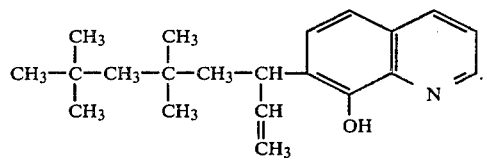

Said compound is made by reacting 8-hydroxyquinoline (sodium salt) with dodecenyl chloride and distilling the resulting alkenyl ether, after pouring into water, separating and washing, the dodecenyl chloride being 1-chloro-5,5,7,7-tetramethyl-2-octene.

Other compounds very useful are 7-[3-(5,5-dimethyl-1-hexenyl)]-8-hydroxyquinoline and 7-[1-(5,5,7,7-tetramethyl-2-octenyl)]-8-hydroxyquinoline.

Such compounds and their preparation are described in U.S. Pat. No. 3,637,711 to W. M. Budde and al. and in Australian Pat. No. 57 173/69 to Ashland Oil Inc.

A preferable extractant is β-dodecenyl 8-hydroxyquinoline having the formula

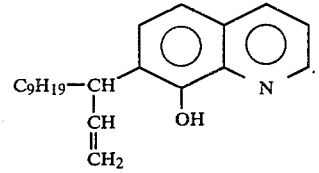

The detailed following description relates essentially to said particular extractant which is called "βoxH extractant". It is commercially available as Kelex 100 from Scherex.

The influence of the acidity on the extracting step is now considered. FIG. 1 presents the percentage of extracted germanium obtained for different acidities. The results of FIG. 1 are obtained during an extracting step in kerosene + 10% of octanol with different concentrations of βoxH. Curves a, b, c and d are respectively for concentration of βoxH of $2.2 \cdot 10^{-2}$ M, $3.1 \cdot 10^{-2}$ M, $8.6 \cdot 10^{-2}$ M and 0.42 M. The concentration of germanium (IV) was $1.4 \cdot 10^{-2}$ M. The pH was obtained by addition of H₂SO₄, or by partial neutralization of H₂SO₄ by NaOH.

The examination of FIG. 1 reveals that the extraction of the germanium (IV) is not uniform inside the range of pH. In particular, extraction is the most efficient at high acidity (pH<1), though a slight decrease appears for sulphuric acid concentration higher than 2 M (curves a and b). At weak acidity and in neutral media (pH from 2 to 8), the extraction is far less efficient but it becomes independent from the pH (the pH has no influence on the extraction ratio and remains itself constant during the extraction). No extraction is observed from alkaline solutions (pH>12) at any concentration of βoxH. So, the domain of acidity can be divided in three parts corresponding to high, low and non-extraction. For the invention, the only interesting part is the high extraction one, that is, for pH under 2.

The maxima of curves a and b also show that the molar amount of extracted germanium is about a quarter of the molar amount of βoxH present. So, to obtain the extraction of substantially all germanium, the molar amount of βoxH extractant shall be at least four times the molar concentration of germanium. In practical operations, it is preferable for the molar amount of βoxH extractant to be at least 5 to 10 times that of germanium.

In these conditions, FIG. 1 shows that 100% of germanium may be extracted according to the invention. However, the total extracted amount is not the only interesting parameter because, commercially, the rate of the reaction has a considerable importance.

The rate of extraction depends on the extractant concentration and on the germanium concentration. To determine the total rate of extraction, tests have been run with the same concentrations of βoxH extractant on the one part and of Ge (IV) on the other part, but for different pH. The βoxH extractant concentration was 200 g/l, and that of Ge (IV) was 1.0 g/l. In a first run, the pH was very acidic, because the medium contained $H_2SO_4$ 0.5 M, and in a second run, the pH was equal to 4. In the first test (with commercial Kelex and 20% of octanol), more than 50% of germanium was extracted after 2 minutes only and, in the second run, a time of more than 20 minutes was necessary for extraction of 50% of germanium. (Kelex purified by distillation gives a slower reaction rate).

These experiments show that the highly acidic media necessary to a high extraction percentage are also necessary for great rates of extraction.

So, the extracting step of the process according to the invention is very rapid and about quantitative, because substantially all germanium is extracted very quickly.

The particular acid used in the extracting step is a non-complexing one, for example, sulphuric acid and nitric acid. Halohydric acids and strong oxidant acids are not suitable. So, nitric acid is suitable only at a concentration at which it doesn't oxidize reactants (e.g. extractant). Sulphuric acid may be used at level of 25° up to 42° Bé at least.

FIG. 1 shows also that, for concentrations of βoxH equal to $2.2.10^{-2}$ and $3.1.10^{-2}$ M, germanium is re-extracted when acidity increases from $H_2SO_4$ 2 M to $H_2SO_4$ 4 M. However, such re-extraction is limited and the stripping step uses preferably an alkaline medium.

The influence of the concentration of oxH extractant is now considered. It has been above-mentioned that a minimum amount of extractant was necessary for the extraction of substantially all germanium, said amount being at least 4 times and preferably at least 5 to 10 times more. However, when the concentration of βoxH is increased, the rate of extraction is also increased. That is a very trivial result which is well known by those skilled in the art.

A great advantage of the invention is to be emphasized relating to said extractant concentration. Said extractant is an expensive product, but its concentration is low; so, the physical losses of organic medium correspond to small losses of extractant. By contrast, in processes using such extractants as LIX 63 (from General Mills Inc.) which are present at very high concentrations, extractant losses are very important and costy.

The influence of diluent is now considered. In order to investigate the role of diluent on the extraction of germanium in the organic phase, experiments were performed at two different acidities of the aqueous phase: on the one hand at $H_2SO_4$ 1.5 M, and on the other hand at pH=5±0.5. In all test runs, the contact time of the two phases was long enough to ensure the attainment of equilibrium. The concentrations of βoxH used were 15 g/l and 40 g/l, giving accurately measurable values of the extraction (neither too high nor too low).

The used diluents were kerosene with 10% v/v of octanol, n-octanol, a petroleum fraction containing mainly aliphatic molecules (Escaid 100) and a petroleum fraction containing mainly aromatic molecules (Solvesso 150).

The examination of the results showed a significant variation of extraction when one diluent was replaced by another. The hierarchy among the diluents was not the same for the two different acidities. At pH 5, n-octanol was the most efficient. However, at low pH (that is, in the conditions used according to the invention), the best diluent was kerosene with 10% v/v of octanol, which is slightly more favourable than the petroleum fraction containing mainly aliphatic molecules (Escaid 100).

The diluent contained a minor proportion of n-alcanol (10% v/v) essentially because such addition prevents the formation of a third phase during the liquid-liquid extraction. However, such addition of n-alcanol, and more generally of a polar lipophilic dissolving agent, has another effect on reactions. In fact, such addition changes interfacial tension between aqueous and organic phases and speeds extraction which progresses essentially at the interface (as indicated by the distribution coefficient of βoxH between aqueous and organic phases, said coefficient being about $10^7$).

Experiments show that the rate of extraction is slightly slowed when the temperature is increased. So, ambient or lower temperature is preferable for the extracting step.

An important aspect for commercial application is the selectivity of the separation. Literature data show that the extraction of germanium (IV) by βoxH extractant can be selective towards cadmium, zinc, cobalt and nickel, but poorly selective towards copper and iron. A quantitative evaluation of such selectivity is indicated in the following example.

An extraction step has been effected with Kelex 100 at 10% in kerosene with 10% of octanol, at ambient temperature, with a ratio organic/aqueous of 1. The initial aqueous solution A and the aqueous phases after a first and second extraction B and C respectively had the following concentrations in grams per liter:

|   | $H^+$ | Ge | In | Fe | Cu | Zn | As |
|---|---|---|---|---|---|---|---|
| A | 3.08 | 1.15 | 0.317 | 1.74 | 0.93 | 47.8 | 11.20 |
| B | 2.72 | <0.05 | 0.324 | 1.82 | 0.895 | 44.8 | ~11 |
| C | 2.30 | — | 0.334 | 1.84 | 0.963 | 50.0 | |

Such results show the excellent selectivity of the extracting step, even against iron.

The stripping step of the process according to the invention is now considered. During such step, said organic phase formed during the extracting step is contacted with an alkaline medium, said stripping step forming an aqueous phase containing the major part of germanium from said aqueous liquor, and an organic phase containing said diluent and said extractant. It is preferable that said diluent and extractant so recovered are recycled to the first extracting step.

The influence of alkalinity on the stripping step is now considered.

The effect of the hydroxide ion concentration on the stripping of said organic phase extracted at the acidities of the industrial leaching baths is complex. When the organic phase is contacted with an alkaline aqueous solution, the overall stripping reaction forms the free $\beta$oxH extractant in at least two steps. Firstly, OH$^-$ anions are extracted from the aqueous solution into the organic phase where they react to produce a dark red coloured compound. The coloration appears a few seconds after both phases have been brought into contact and increases in about one minute after that. Secondly, the dark colour disappears slowly by decomposition and germanium (IV) is stripped. In the first step, the higher the hydroxide ion concentration, the slower the reaction is. During the second step, the process is reversed.

Experiments show that a high pH is preferable and the aqueous alkaline solution is preferably a NaOH solution because NaOH is a strong alkaline medium, cheap and easily available. The pH of said alkaline medium is preferably greater than 10 and said alkaline medium is preferably NaOH 3.0 M. pH between 13 and 14.7 are especially advantageous.

Alkaline solutions other than NaOH also re-extract germanium during the stripping steps. Good results are obtained with NH$_4$OH 3 N and Na$_2$CO$_3$ 3 N.

Figure 2:
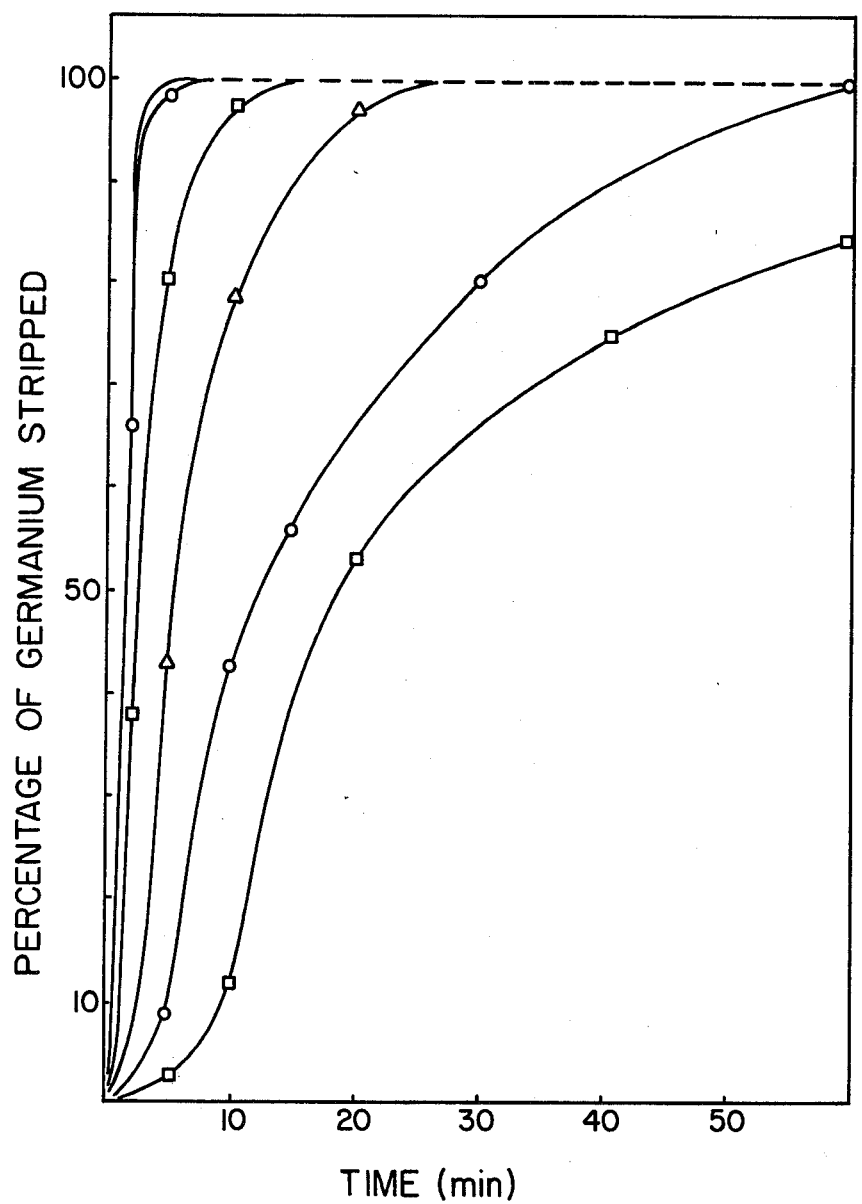
FIG. 2 is a graph illustrating the influence of the temperature on the stripping in a process according to the invention.

The influence of the temperature on the stripping of germanium is now considered, referring to FIG. 2. FIG. 2 shows curves representing variation of percentage of stripped germanium according to time. The initial germanium concentration was $9.5.10^{-3}$ M and that of $\beta$oxH extractant $5.0.10^{-2}$ M. The alkaline medium was an aqueous solution of sodium hydroxide 1.2 M. Curves a, b, c, d, e and f are for temperatures of 25° C., 30° C., 40° C., 50° C., 60° C. and 70° C., respectively. FIG. 2 shows that the temperature has a great influence on the stripping step. So, it is preferable for the stripping step to be used at a temperature of at least 40° C. Such temperature may be easily obtained with waste heat. However, such heating increases the temperature of the organic phase which has to be cooled before use for the extracting step.

When the temperature is at least 40° C., it is preferable to shake the stripping medium, because the reaction rate is then high enough to be greater than that allowed by the limited interface of the two quiet phases.

The nearly complete and easy re-extraction of germanium with alkaline solution, as NaOH 3 N, according to the invention, is a great advantage. Experiments with solutions containing 3, 5,7,5 and 10% of Kelex in kerosene with 10% of octanol regularly give re-extraction ratios greater than 99%.

A continuous experiment during a long period (102 h at 70°–80° C.) in a closed loop pilot plant showed no degradation of Kelex and very small losses of such extractant.

The behaviour of extractant according to the invention presents great differences with that of 8-hydroxyquinoline, called "oxine". The applications of oxine in liquid-liquid extraction are limited because of its high solubility in acidic and alkaline aqueous solutions. By contrast, extractants according to the invention have hydrophobic substituents which replace one or more hydrogen atoms of the molecule. Such extractants have low solubility in acidic and alkaline aqueous solutions and give high distribution coefficients. The $\beta$-dodecenyl $\beta$-hydroxyquinoline ($\beta$oxH) is an interesting oxine derivative because, among other interesting derivatives according to the invention, it is commercially available as Kelex 100 from Scherex.

EXAMPLE

Figure 3:
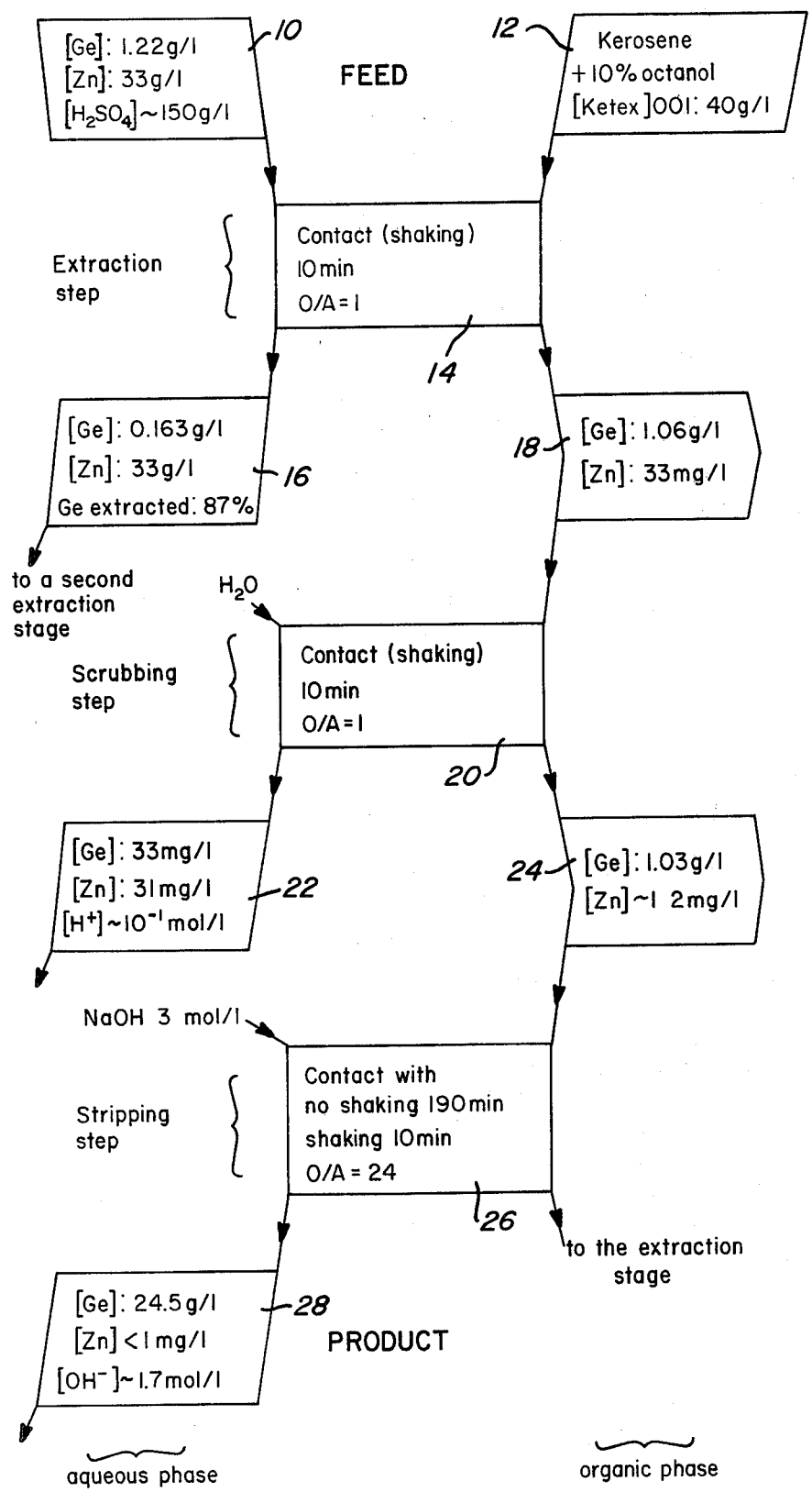
FIG. 3 is a diagram illustrating the main steps of a process according to the invention.

FIG. 3 is a diagram illustrating the main steps of a process according to the invention. The leach liquor contains essentially Zn (33 g/l) and H$_2$SO$_4$ (150 g/l) and a small amount of germanium (1.22 g/l). Said leach liquor 10 is contacted with an organic medium 12 containing, in a diluent comprising kerosene and 10% v/v of octanol, 40 g/l of Kelex 100 ($\beta$-dodecenyl 8-hydroxyquinoline). The contacting step 14 between equal volumes of leach liquor and organic medium forms an aqueous phase 16, containing nearly all Zn and a small quantity of germanium, and an organic phase containing the greatest part of germanium (87%) and a very small portion of Zn. The aqueous phase is submitted to a second extraction stage. The organic phase 18 is contacted with water, in a scrubbing step 20, in equal volumes. Said scrubbing step forms an aqueous phase 22 containing the major part of Zn of the organic phase, with about all H$^+$. A small portion of Ge is also included in the aqueous phase. The organic phase 24 of the scrubbing step contains 83% of germanium from leach liquor and an insignificant amount of Zn. Said organic phase is contacted with NaOH in a stripping step 26 first without shaking (190 minutes) and after with shaking (10 minutes). The volume of the aqueous phase is smaller than that of organic phase (ratio of 24). Said stripping step forms an aqueous phase containing germanium and an organic phase containing the diluent which may be used for the extraction step.

In an other example, the leach liquor 10 contained 1.15 g/l of Ge and 47.8 g of Zn, with 145 g/l of H$_2$SO$_4$, said organic medium 12 being the same as in preceding example. Contact time was 10 minutes in step 14. The organic phase contained 1.10 g/l of Ge and the aqueous one less than 0.050 g/l of Ge (extraction >95%). Subsequent stripping by NaOH 3 N gave a re-extraction greater than 99% (with shaking).

The invention is not limited to the treatment of leach liquors. Another specific application is the extraction of germanium from speiss. Said extraction is selective for germanium against iron and arsenic.

We claim:

1. A process for selective liquid-liquid extraction of germanium from an aqueous acidic liquor containing, besides germanium, at least one other metal selected from the group consisting of cadmium, cobalt and nickel, said process comprising,
   adjusting the pH of said aqueous liquor to a value lower than 2 before extracting germanium from said aqueous liquor,
   extracting germanium from said aqueous liquor by contacting said liquor with an organic medium which contains a diluent and an extractant, said diluent being immiscible with said aqueous liquor, said extractant being an oxine derivative having a long hydrocarbon chain containing 8 to 16 carbon atoms, said extracting step forming an aqueous phase containing the major part of said at least one other metal and an organic phase containing the major part of germanium from said aqueous liquor, and stripping germanium from said organic phase by contacting said phase with an alkaline medium, said stripping step forming an aqueous phase containing the major part of germanium from said aqueous liquor and an organic phase containing said diluent and said extractant.

2. Process according to claim 1 wherein said diluent is selected from the group consisting of pure and mixed aliphatic compounds and petroleum fractions.

3. Process according to claim 2 wherein said diluent contains also a minor portion of at least one compound selected from the group consisting of alcohols and phenols.

4. Process according to claim 1 wherein the pH of said alkaline medium used in said stripping step is greater than 10.

5. Process according to claim 4, wherein the pH of said alkaline medium used in stripping step is greater than 13.

6. Process according to claim 1, wherein the long hydrocarbon chain of said extractant includes at least one ethylenical unsaturation.

7. Process according to claim 1, wherein said extractant is β-dodecenyl-8-hydroxyquinoline.

8. Process according to claim 1 wherein said adjusting of the pH includes addition of sulphuric acid.

9. Process according to claim 4 wherein said alkaline medium is NaOH.

10. Process according to claim 1 wherein the temperature of said leach liquor and said organic medium during said extracting step is ambient or lower.

11. Process according to claim 1 wherein the temperature of said alkaline medium and said organic phase during said stripping step is at least equal to 40° C.

12. Process according to claim 1 wherein the concentraction of extractant in organic medium is such that there are at least 4 moles of extractant for 1 mole of germanium in said aqueous acidic liquor.

13. Process according to claim 1 wherein said extractant is β-dodecenyl 8-hydroxyquinoline, said diluent is kerosene containing a minor portion of octanol, and said aqueous acidic liquor is an acidic leach liquor containing zinc.

* * * * *